United States Patent
Sanwald et al.

(10) Patent No.: US 12,447,485 B2
(45) Date of Patent: Oct. 21, 2025

(54) POWDER CONVEYING CHAMBER FOR A DENSE PHASE POWDER PUMP AND DENSE PHASE POWDER PUMP COMPRISING A POWDER CONVEYING CHAMBER

(71) Applicant: GEMA SWITZERLAND GMBH, St. Gallen (CH)

(72) Inventors: Marco Sanwald, Abtwil (CH); Hanspeter Michael, Gossau (CH); Erich Sutter, St. Gallen (CH)

(73) Assignee: GEMA SWITZERLAND GMBH, St. Gallen (CH)

( * ) Notice: Subject to any disclaimer, the term of this patent is extended or adjusted under 35 U.S.C. 154(b) by 191 days.

(21) Appl. No.: 18/576,739

(22) PCT Filed: Jul. 6, 2022

(86) PCT No.: PCT/EP2022/068781
§ 371 (c)(1),
(2) Date: Jan. 4, 2024

(87) PCT Pub. No.: WO2023/280939
PCT Pub. Date: Jan. 12, 2023

(65) Prior Publication Data
US 2024/0286155 A1    Aug. 29, 2024

(30) Foreign Application Priority Data
Jul. 9, 2021    (DE) .......................... 102021117798.7

(51) Int. Cl.
*B65G 53/28*    (2006.01)
*B05B 7/14*    (2006.01)

(52) U.S. Cl.
CPC ............ *B05B 7/1459* (2013.01); *B65G 53/28* (2013.01)

(58) Field of Classification Search
None
See application file for complete search history.

(56) References Cited

U.S. PATENT DOCUMENTS

| | | | |
|---|---|---|---|
| 3,260,285 A * | 7/1966 | Vogt ......................... | B65B 1/16 53/436 |
| 6,283,680 B1 * | 9/2001 | Vidal ..................... | B65G 53/32 222/207 |

(Continued)

FOREIGN PATENT DOCUMENTS

| | | |
|---|---|---|
| DE | 102005006522 B3 | 8/2006 |
| DE | 202004021621 U1 | 10/2009 |

(Continued)

OTHER PUBLICATIONS

German Office Action dated Dec. 16, 2021, for corresponding German Application No. 102021117798.7.

(Continued)

*Primary Examiner* — Joseph A Dillon, Jr.
(74) *Attorney, Agent, or Firm* — Kinney & Lange, P.A.

(57) ABSTRACT

A powder conveying chamber for a dense-phase powder pump for conveying powder, in particular coating powder, has an end region via which the powder conveying chamber is or can be fluidically connected to a powder line, wherein the end region of the powder conveying chamber is configured as a transition region and designed to reduce an effective flow cross-section of the powder conveying chamber to an effective flow cross-section of the powder line and/or to an effective flow cross-section of a valve arranged between the powder conveying chamber and the powder line, in particular a pinch valve. In particular, a cleaning system is associated with the end region, with which the end region can be supplied with cleaning air in the form of pressurized air, in order to keep the end region free of (Continued)

powder deposits or in order to remove powder deposits in the end region.

23 Claims, 4 Drawing Sheets

(56) References Cited

U.S. PATENT DOCUMENTS

| | | | | |
|---|---|---|---|---|
| 6,478,513 B1* | 11/2002 | Higuchi | ............. | F04B 15/02 |
| | | | | 406/26 |
| 6,508,610 B2* | 1/2003 | Dietrich | ............. | B65G 53/28 |
| | | | | 406/13 |
| 6,623,215 B2* | 9/2003 | Dietrich | ............. | B05B 7/1459 |
| | | | | 406/197 |
| 6,648,558 B1* | 11/2003 | Shultz | ............. | B65G 53/12 |
| | | | | 406/154 |
| 6,659,693 B1* | 12/2003 | Perkins | ............. | B65G 51/24 |
| | | | | 406/13 |
| 7,144,213 B2* | 12/2006 | Cartwright | ............. | G01F 3/20 |
| | | | | 414/217 |
| 7,150,585 B2* | 12/2006 | Kleineidam | ............. | B65G 53/28 |
| | | | | 406/146 |
| 7,163,359 B2* | 1/2007 | Moser | ............. | F04B 15/00 |
| | | | | 406/151 |
| 7,241,080 B2* | 7/2007 | Klobucar | ............. | F04F 5/54 |
| | | | | 406/146 |
| 7,287,964 B2* | 10/2007 | Sanwald | ............. | F04B 53/1057 |
| | | | | 417/397 |
| 7,410,329 B2* | 8/2008 | Simontacchi | ............. | B65G 53/28 |
| | | | | 406/123 |
| 7,452,166 B2* | 11/2008 | von Keudell | ............. | B65D 90/56 |
| | | | | 406/137 |
| 7,465,130 B2* | 12/2008 | Herre | ............. | B05B 7/1459 |
| | | | | 406/50 |
| 7,648,312 B2* | 1/2010 | Kleineidam | ............. | B05B 7/1459 |
| | | | | 406/146 |
| 7,740,423 B2* | 6/2010 | Newbolt | ............. | F16K 51/02 |
| | | | | 406/14 |
| 8,057,129 B2* | 11/2011 | Kleineidam | ............. | B65G 53/28 |
| | | | | 406/146 |
| 8,231,310 B2* | 7/2012 | Sanwald | ............. | B05B 7/1459 |
| | | | | 406/146 |
| 8,333,570 B2* | 12/2012 | Fulkerson | ............. | F04F 5/48 |
| | | | | 417/86 |
| 8,491,226 B2* | 7/2013 | Kleineidam | ............. | B05B 7/1459 |
| | | | | 406/146 |
| 8,491,227 B2* | 7/2013 | Fulkerson | ............. | A01D 87/10 |
| | | | | 406/14 |
| 8,678,777 B2* | 3/2014 | Fulkerson | ............. | F04F 5/48 |
| | | | | 417/86 |
| 8,790,048 B2* | 7/2014 | Furuyama | ............. | B65G 53/40 |
| | | | | 406/50 |
| 8,801,340 B2* | 8/2014 | Berggren | ............. | B65G 53/52 |
| | | | | 406/89 |
| 8,951,022 B2* | 2/2015 | Mauchle | ............. | B05B 7/1459 |
| | | | | 417/187 |
| 9,085,065 B2* | 7/2015 | Reilley | ............. | B24C 9/006 |
| 9,108,808 B2* | 8/2015 | Furuyama | ............. | B01D 53/12 |
| 9,175,781 B2* | 11/2015 | Reilley | ............. | B65G 53/40 |
| 9,181,045 B2* | 11/2015 | Reilley | ............. | B65G 53/60 |
| 9,617,086 B2* | 4/2017 | Rusterholz | ............. | B65G 51/02 |
| 9,834,391 B2* | 12/2017 | Mauchle | ............. | G05D 7/012 |
| 11,009,424 B2* | 5/2021 | Beuk | ............. | B05B 15/14 |
| 11,033,916 B2* | 6/2021 | Mauchle | ............. | B05C 19/04 |
| 11,224,886 B2* | 1/2022 | Lutz | ............. | B05B 7/1472 |
| 11,536,296 B2* | 12/2022 | Perillo | ............. | F04B 39/10 |
| 11,543,038 B2* | 1/2023 | Fulkerson | ............. | F04B 53/10 |
| 11,999,576 B2* | 6/2024 | Klose | ............. | B65G 53/66 |
| 2001/0003568 A1* | 6/2001 | Dietrich | ............. | B65G 53/28 |
| | | | | 406/151 |
| 2006/0193704 A1* | 8/2006 | Simontacchi | ............. | B05B 7/1459 |
| | | | | 406/88 |
| 2007/0095945 A1* | 5/2007 | Keudell | ............. | B65D 90/56 |
| | | | | 239/398 |
| 2008/0190359 A1* | 8/2008 | Mauchle | ............. | B05B 7/1459 |
| | | | | 118/308 |
| 2008/0205999 A1* | 8/2008 | Rieger | ............. | B05B 7/1459 |
| | | | | 406/96 |
| 2010/0255975 A1* | 10/2010 | Mauchle | ............. | B04C 5/14 |
| | | | | 494/23 |
| 2010/0278597 A1* | 11/2010 | Borzone | ............. | B65G 53/525 |
| | | | | 406/108 |
| 2012/0282398 A1* | 11/2012 | Fulkerson | ............. | B05D 7/227 |
| | | | | 427/180 |
| 2014/0044578 A1* | 2/2014 | Sanwald | ............. | B05B 7/1459 |
| | | | | 417/559 |
| 2016/0052000 A1* | 2/2016 | Mauchle | ............. | B65G 53/30 |
| | | | | 118/308 |
| 2017/0052088 A1* | 2/2017 | Beuk | ............. | F04B 51/00 |
| 2019/0293092 A1* | 9/2019 | Perillo | ............. | F04B 7/0275 |
| 2021/0207721 A1* | 7/2021 | Fulkerson | ............. | F04B 53/10 |
| 2022/0323977 A1* | 10/2022 | Mauchle | ............. | B65G 53/28 |
| 2024/0286155 A1* | 8/2024 | Sanwald | ............. | B65G 53/28 |
| 2024/0316582 A1* | 9/2024 | Sutter | ............. | B05B 7/1459 |
| 2024/0316591 A1* | 9/2024 | Tobler | ............. | B05C 11/1026 |

FOREIGN PATENT DOCUMENTS

| | | |
|---|---|---|
| DE | 102013205895 A1 | 10/2014 |
| DE | 102013211550 A1 | 12/2014 |
| DE | 102017103487 A1 | 8/2018 |
| EP | 1857384 A2 | 11/2007 |

OTHER PUBLICATIONS

International Preliminary Report on Patentability dated Feb. 3, 2023, for corresponding PCT Application No. PCT/EP2022/068781.

International Search Report and Written Opinion dated Nov. 7, 2022, for corresponding PCT Application No. PCT/EP2022-068781.

English translation of International Preliminary Report on Patentability dated Feb. 3, 2023, for corresponding PCT Application No. PCT/EP2022/068781.

* cited by examiner

POWDER CONVEYING CHAMBER FOR A DENSE PHASE POWDER PUMP AND DENSE PHASE POWDER PUMP COMPRISING A POWDER CONVEYING CHAMBER

CROSS-REFERENCE TO RELATED APPLICATION(S)

This application is a U.S. National Stage Application of PCT International Application No. PCT/EP2022/068781, filed on Jul. 6, 2022, entitled "POWDER CONVEYING CHAMBER FOR A DENSE-PHASE POWDER PUMP AND DENSE-PHASE POWDER PUMP COMPRISING A POWDER CONVEYING CHAMBER," which claims priority to German Patent Application No. 10 2021 117 798.7, filed on Jul. 9, 2021, which are incorporated herein by reference in their entireties.

BACKGROUND

The present disclosure relates to a powder conveying chamber for a dense phase powder pump.

Accordingly, the present disclosure relates in particular to a powder conveying chamber for a dense phase powder pump for conveying powder, particularly coating powder, wherein the powder conveying chamber has an end region via which the powder conveying chamber is fluidly connected or connectable to a powder line as needed by means of a valve, in particular a pinch valve. The end region of the powder conveying chamber is thereby configured as a transition region and designed to reduce an effective sectional area of flow of the powder conveying chamber to an effective sectional area of flow of the valve in the open state or, respectively, to an effective sectional area of flow of the powder line.

The present disclosure further relates to a dense phase powder pump including at least one such powder conveying chamber.

The disclosed dense phase powder pump in particular serves in the conveying of coating powder from a first powder reservoir to a second powder reservoir arranged downstream of the dense phase powder pump or a powder spray gun or similar device for spraying coating powder arranged downstream of the dense phase powder pump.

The principle of dense phase powder pumps of the aforementioned type is known from the prior art.

For example, EP 1 551 558 A1 relates to a dense phase powder pump having a first powder conveying chamber and a second powder conveying chamber arranged parallel to the first powder conveying chamber. The two powder conveying chambers of this known prior art dense phase powder pump are limited on both the suction side as well as the conveyance side by a mechanically operated pinch valve arrangement.

It is thereby specifically provided for the powder hoses connected to the respective powder conveying chambers of the dense phase powder pump in the suction-side or conveyance-side region of the dense phase powder pump to be deformable by a mechanical force so as to squeeze or respectively open the hose section as necessary. The two parallelly arranged powder conveying chambers are operated in alternating phases, meaning that one of the two powder conveying chambers draws in coating powder through the powder inlet of the dense phase powder pump while the other of the two powder conveying chambers dispenses a portion of coating powder previously drawn into the powder conveying chamber through the powder outlet of the dense phase powder pump.

Dense phase powder pumps having a plurality of, in particular two, powder conveying chambers connected in parallel to each other are also known from WO 2005/005060 A2 (US 2006/0193704 A1), DE 199 59 473 A1 (US 2001/0003568 A1) and EP 1 752 399 A1.

Using dense phase powder pumps to convey coating powder to appropriate devices for spraying coating powder, such as powder spray coating guns in particular, is known from DE 196 11 533 B4, WO 2004/087331 A1 and EP 1 566 352 A2).

Before the use of dense phase powder pumps for conveying coating powder became known, powder pumps designed as injectors were used, these also still being used today for coating powder conveyance. Unlike dense phase powder pumps, however, powder pumps designed as injectors, which are also referred to as "dilute phase powder pumps," have the disadvantage of these powder pumps usually only being able to convey a relatively small amount of coating powder per unit of time.

Dense phase powder pumps have insofar become widely established in practice, particularly for those applications in which a relatively large amount of coating powder needs to be conveyed per unit of time.

Yet it has been shown in practical use that a dense phase powder pump such as that known from EP 1 551 558 A1, for example, has problems with continuous powder conveyance, particularly with certain types of powder, or respectively requires relatively frequent servicing.

The present disclosure is intended to solve the task of easily preventing or at least reducing powder accumulations and powder blockages during the powder conveying mode of a dense phase powder pump of the aforementioned type, particularly at the powder inlet side of the dense phase powder pump's powder conveying chamber and/or at the powder outlet side of the powder conveying chamber. This is in particular also to apply to types of powder which have a tendency to clump and/or cling when being conveyed.

In particular, a dense phase powder pump of the aforementioned type is to be further developed in such a way as to be less prone to requiring maintenance during operation and so as to ensure the continuous and uniform conveyance of powder, irrespectively of powder type in particular.

SUMMARY

Accordingly, the present disclosure relates in particular to a powder conveying chamber for a dense phase powder pump for conveying powder, particularly coating powder, wherein the powder conveying chamber has an end region via which the powder conveying chamber is fluidly connected or connectable to a powder line as needed by means of a valve, in particular a pinch valve. The end region of the powder conveying chamber is thereby configured as a transition region and designed to reduce an effective sectional area of flow of the powder conveying chamber to an effective sectional area of flow of the valve in the open state or, respectively, to an effective sectional area of flow of the powder line.

The present disclosure in particular provides for a cleaning system to be allocated to the end region of the powder conveying chamber via which in particular cleaning air in the form of compressed air can be supplied to the end region, particularly as necessary, in order to keep the end region free of powder deposits or to remove deposits of powder at the end region.

Providing such an end region cleaning system can effectively prevent disruptive and thus unwanted powder accumulations (powder aggregation) and potentially associated powder blockage at the powder inlet and/or powder outlet of the powder conveying chamber during the powder conveying mode of the dense phase powder pump.

Specifically, the cleaning system can aid in cleaning the corresponding end region, and particularly the intake and output region of the powder conveying chamber, during the output phase of the dense phase powder pump, and in particular at the end of the output phase, or during a cleaning cycle of the dense phase powder pump.

When, for example, cleaning air is introduced into the end regions of the powder conveying chamber during the output cycle of the dense phase powder pump in addition to the conveying compressed air introduced into the powder conveying chamber (by applicable positive pressure being applied to the powder conveying chamber), an effective flushing of the end regions of the powder conveying chamber then results. This thereby optimally prevents or at least reduces powder aggregation and thus accompanying blockage.

Various approaches are conceivable in implementing the end region cleaning. According to preferential embodiments, it is provided for some areas of the end region of the powder conveying chamber, which is in particular of at least partially conical design, to be designed as a filter accordingly defining the area of the end region. The filter is permeable to air but not to coating powder and surrounded by an annular chamber to which compressed air can be connected as needed.

Implementations of the disclosed solution particularly provide for assigning a control device to the cleaning system which is designed to fluidly connect at least one cleaning air outlet of the powder conveying chamber's end region to a compressed air supply line or a compressed air source when needed. The control device is in particular designed to fluidly connect the at least one cleaning air outlet of the powder conveying chamber's end region to the compressed air supply line or the compressed air source during a cleaning operation.

Alternatively or additionally thereto, the control device is designed to fluidly connect the at least one cleaning air outlet of the powder conveying chamber's end region to the compressed air supply line or compressed air source during a powder output cycle of the powder conveying chamber.

According to further developments of the latter embodiments, it is provided for the control device to be designed so as to regulate the volume of compressed air to be supplied to the at least one cleaning air outlet of the powder conveying chamber's end region per unit of time, particularly as a function of an operating state and/or operating cycle of the powder conveying chamber. It thereby makes sense for the control device to be designed to supply a higher volume of compressed air per unit of time to the at least one cleaning air outlet of the powder conveying chamber's end region during a cleaning operation compared to the volume of compressed air to be supplied to the at least one cleaning air outlet per unit of time during the powder output mode.

Embodiments of the disclosed powder conveying chamber provide for the end region of the powder conveying chamber to be fluidly connected or connectable to the powder line by means of a valve, in particular a pinch valve, wherein the valve, particularly pinch valve, exhibits an effective sectional area of flow in its open state. It thereby makes sense for the end region of the powder conveying chamber to be designed so as to reduce the sectional area of flow of the powder conveying chamber to the effective sectional area of flow of the valve, in particular pinch valve, in its open state.

As with the end region of the powder conveying chamber, the powder conveying chamber itself, or a main body region of the powder conveying chamber respectively, is to include at least one air exchange opening which is in particular designed and formed separately from a cleaning air outlet of the end region for alternately connecting fluidly to a vacuum line or vacuum source or to a compressed air supply line or compressed air source for drawing powder into the powder conveying chamber or, respectively, pneumatically expelling a portion of powder within the powder conveying chamber which had previously been sucked in.

According to embodiments of the present disclosure, the powder conveying chamber has a first end region and an oppositely disposed second end region, wherein the powder conveying chamber is or can be fluidly connected to a first powder line via the first end region and is or can be fluidly connected to a second powder line via the second end region. The first and/or second end region of the powder conveying chamber is/are thereby respectively implemented as a transition region and designed to reduce an effective sectional area of flow of the powder conveying chamber to an effective sectional area of flow of the corresponding powder line. This further development in particular provides for both the first as well as the second end region to be allocated a cleaning system via which cleaning air in the form of compressed air can be supplied to the respective end region, particularly as necessary, in order to keep the respective end region free of powder deposits or to remove deposits of powder at the end region.

Preferably, the diameter decreases at both end regions of the powder conveying chamber, which results in a reduction in cross-section and consequently, due to changing material speeds, to turbulence but also to an increase in impact, which can ultimately result in powder deposits on the conical surfaces. These can be increasingly observed at the entrance area of the powder conveying chamber. To counteract this, the end regions of the powder conveying chamber are provided with a corresponding cleaning system. The end regions of the powder conveying chamber can in particular be designed as separate, i.e. exchangeable end pieces, which at least partially consist of porous material and can be pressurized with compressed air such that the conical inner wall surface of the end pieces are flushed with air.

According to embodiments of the present disclosure, the cleaning system has a filter element which is permeable to air but not to powder and in particular has at least some conically tapering areas. The conical filter element defines the extent of the powder conveying chamber at its end region. The filter element is surrounded by an annular chamber formed by a filter housing, wherein compressed air can be connected to the annular chamber when needed.

The filter element is preferably releasably connected or connectable to an end region of an in particular cylindrical main body region of the powder conveying chamber by its larger end region in terms of diameter. On the other hand, the filter element is preferably releasably connected or connectable to an end region of the powder line or to an end region of a valve, in particular a pinch valve, arranged between the powder conveying chamber and the powder conveying line by its smaller end region in terms of diameter.

The present disclosure further relates to a cleaning system for the end region of a powder conveying chamber, in particular a powder conveying chamber of the aforementioned type. The cleaning system is designed to supply cleaning air in the form of compressed air to the end region of the powder conveying chamber, particularly as necessary, in order to keep the end region free of powder deposits or to remove deposits of powder at the end region.

The present disclosure further relates to a dense phase powder pump for conveying coating powder from a first powder reservoir to a second downstream powder reservoir or to a downstream powder spray coating gun or similar device for spraying coating powder. The dense phase powder pump has at least one powder conveying chamber of the aforementioned type which is fluidly connected or connectable to the first powder reservoir via a powder inlet and to the second powder reservoir, or to the powder spray coating gun or similar device for spraying coating powder respectively, via a powder outlet. A respective inlet or outlet valve is provided at the powder inlet of the dense phase powder pump as well as at the powder outlet of the dense phase powder pump.

Preferential embodiments of the disclosed dense phase powder pump provide for particularly the powder inlet valve to be of appropriately oversized design compared to the powder outlet valve. This embodiment is based on the recognition that the powder inlet valve of the dense phase powder pump is instrumentally crucial to regulating the flow of powder actually able to be conveyed by the dense phase powder pump per unit of time. Embodiments of the disclosed dense phase powder pump insofar provide for the at least one powder inlet valve to exhibit a larger effective sectional area of flow in its open state than an effective sectional area of flow of the powder outlet valve in its open state.

Alternatively thereto, embodiments of the disclosed dense phase powder pump provide for the at least one powder inlet valve and the at least one powder outlet valve to have at least substantially the same effective sectional area of flow in their respective open state. This embodiment has the advantage of being able to use structurally identical valves for the at least one powder inlet valve and the at least one powder outlet valve, which is associated with advantages in terms of maintenance and stocking of spare parts.

According to the present disclosure, the dense phase powder pump has a powder inlet connected or connectable to the (upstream) first powder reservoir and a powder outlet connected or connectable to the (downstream) second powder reservoir or the (downstream) powder spray coating gun or similar device for spraying coating powder. The powder inlet of the dense phase powder pump can thereby be arranged at a first end region of the dense phase powder pump and the powder outlet of the dense phase powder pump can be arranged at an oppositely disposed second end region of the dense phase powder pump, wherein the at least one powder conveying chamber of the dense phase powder pump is arranged between the powder inlet and the powder outlet of the dense phase powder pump.

In one advantageous implementation of the present disclosure, the at least one powder conveying chamber of the disclosed dense phase powder pump has a powder inlet with the at least one powder inlet valve at a first end region and a powder outlet with the at least one powder outlet valve at an oppositely disposed second end region. The powder inlet of the at least one powder conveying chamber is or can be fluidly connected to the powder inlet of the dense phase powder pump via the at least one powder inlet valve. On the other hand, the powder outlet of the at least one powder conveying chamber of the dense phase powder pump is or can be fluidly connected to the powder outlet of the dense phase powder pump via the at least one powder outlet valve.

According to another aspect of the present disclosure, the dense phase powder pump has a powder inlet connected or connectable to the first powder reservoir and a powder outlet connected or connectable to the second powder reservoir or to the powder spray coating gun or similar device for spraying coating powder, wherein the at least one powder conveying chamber of the disclosed dense phase powder pump has a powder duct at one end region which serves both as a powder inlet as well as a powder outlet for the at least one powder conveying chamber. According to this aspect of the present disclosure, it is advantageous for the powder duct of the at least one powder conveying chamber to be fluidly connected or connectable to the powder inlet of the dense phase powder pump via the at least one powder inlet valve of the dense phase powder pump, whereby the powder duct of the at least one powder conveying chamber is fluidly connected or connectable to the powder outlet of the dense phase powder pump via the at least one powder outlet valve.

According to one preferential implementation, it is provided for the dense phase powder pump to further include a distributor in order to fluidly connect the powder duct of the powder conveying chamber to the powder inlet valve on one side and the powder outlet valve on the other. Using a Y-piece as a distributor is thereby particularly conceivable. However, other embodiments are of course also conceivable in this regard.

A control device is furthermore provided in preferential embodiments of the disclosed solution, same being designed to alternately control the at least one powder inlet valve and/or the at least one powder outlet valve of the dense phase powder pump. The control device is preferably further designed to alternately apply positive pressure and negative pressure in the at least one powder conveying chamber of the dense phase powder pump.

The at least one powder conveying chamber of the dense phase powder pump is preferably allocated a gas duct through which the corresponding powder conveying chamber can be alternately connected to a vacuum line or vacuum source for drawing coating powder into the powder conveying chamber through the open powder inlet valve while the powder outlet valve is closed or to a compressed air line or compressed air source for pneumatically expelling a portion of powder present within the powder conveying chamber through the open powder outlet valve while the powder inlet valve is closed. The control device is thereby designed to alternatingly switch the one powder conveying chamber between suction and discharge.

In advantageous implementations of the dense phase powder pump according to the present disclosure, the aforementioned gas duct has a suction air opening and a compressed air opening in a peripheral wall of the powder conveying chamber housing, wherein a microporous filter element, preferably in the form of a filter tube, is preferably also provided which forms the peripheral wall of the powder conveying chamber over at least part of the length or preferably the entire length of the powder conveying chamber and separates the powder conveying chamber from an annular chamber. The annular chamber is formed between the outer circumference of the filter element preferably designed as a filter tube and the inner circumference of the housing peripheral wall and surrounds the filter element preferably designed as a filter tube. The filter element preferably designed as a filter tube is permeable to air but not to coating powder due to its small pore size. It preferably consists of a sintered material.

The at least one powder inlet valve and the at least one powder outlet valve of the disclosed dense phase powder pump are preferably each designed as a pinch valve, in particular of the style having a flexible elastic hose as a valve channel, whereby actuating compressed air can squeeze together said flexible elastic hose in a pressure chamber surrounding the hose in order to close the corresponding valve.

Particularly advantageous in this context is for the at least one powder inlet valve designed as a pinch valve and the at least one powder outlet valve designed as a pinch valve to each include a pinch valve housing having a powder inlet and a powder outlet as well as an elastically deformable valve element, preferably in the form of a hose section. The valve element should thereby particularly be arranged in the interior of the pinch valve housing such that the powder inlet of the pinch valve can be brought into fluid communication with the powder outlet of the pinch valve by the valve element formed as a hose section.

It is thereby advantageous for the pinch valve housing to include at least one connection for supplying compressed air (actuating compressed air) as needed into the space formed between the inner wall of the pinch valve housing and the valve element arranged inside the pinch valve housing. When actuating compressed air is supplied, excess pressure develops in the space between the inner wall of the pinch valve housing and the valve element, as a result of which the valve element is radially compressed and the pinch valve closed. When pressure is subsequently relieved in the pinch valve housing, the valve element returns to its initial state of there being fluid communication between the powder inlet of the pinch valve and the outlet of the pinch valve via the valve element.

According to one aspect of the present disclosure, it is further provided in this regard for a negative pressure to be applied in the powder conveying chamber during the suction phase of the powder conveying chamber at the earliest simultaneously with or preferably at a specific lag time subsequent to a control signal to open the powder inlet valve arranged at the powder inlet of the powder conveying chamber so that the negative pressure in the powder conveying chamber begins to build up at the earliest at the same time as the powder inlet valve opens, preferably, however, by the cited predetermined lag time subsequent the opening of the powder inlet valve. The predetermined lag time is preferably in a range of between 0 ms and 50 ms for one conveying cycle of the conveying chamber (=dense phase powder pump cycle) of approximately 200 ms. However, this example does not exclude the use of other lag times and cycle times for the dense phase powder pump.

Not applying negative pressure in the powder conveying chamber during the suction phase of the dense phase powder pump until the powder inlet valve has already opened, or respectively simultaneously with the opening of the powder inlet valve at the earliest, enables advantageous implementations of the disclosed solution to achieve the negative pressure in the powder conveying chamber less strongly counteracting an opening movement of the powder inlet valve, particularly when designed as a pinch valve, at least at the point in time of the powder inlet valve beginning its opening movement, than in solutions known from the prior art and designed as multi-chamber dense phase powder pumps.

To shorten the response time of the disclosed dense phase powder pump and thus increase its conveying frequency, it is preferably provided additionally or alternatively to the aforementioned measure for the powder inlet valve provided at the powder inlet of the powder conveying chamber as well as the powder outlet valve provided at the powder outlet of the powder conveying chamber to each be designed as a pneumatically actuatable pinch valve. Corresponding control valves supplying actuating compressed air to said pinch valves in a coordinated manner are used to activate the pinch valves.

Preferential embodiments of the disclosed dense phase powder pump provide for shortening the length of the pneumatic control lines to the pinch valves as much as possible in order to ensure being able to minimize response lag times when actuating the corresponding pinch valves; i.e. when supplying actuating compressed air or when applying a negative pressure or when venting the corresponding pinch valve housings respectively.

To that end, a block of material preferably composed of multiple modules, for example, in which the at least one powder conveying chamber of the dense phase powder pump is formed or on which the at least one powder conveying chamber of the dense phase powder pump is arranged is provided in preferential embodiments of the disclosed dense phase powder pump, wherein the powder inlet valve and the powder outlet valve of the at least one powder conveying chamber of the dense phase powder pump are also advantageously arranged on this material block. In particular, the corresponding control valves serving to pneumatically actuate the powder inlet and powder outlet valves, each preferably designed as a pinch valve, are thereby directly connected fluidically to the powder inlet valve or powder outlet valve via compressed air channels formed in the material block so as to ensure the supply and removal of actuating air to the powder inlet/powder outlet valve formed as a pinch valve.

Further advantageous in this context is for all the control valves which are fluidly connected to the at least one powder conveying chamber of the disclosed dense phase powder pump for the supply of conveying compressed air (during the dispensing phase of the dense phase powder pump) and of vacuum (during the suction phase of the dense phase powder pump) to be arranged on the material block and directly connected fluidically to the one powder conveying chamber by means of channels formed in the material block.

These measures can achieve the greatest possible shortening of the length of the pneumatic control lines to the pinch valves and the length of the air lines to the at least one powder conveying chamber in order to ensure being able to minimize response lag times when the corresponding pinch valves are actuated; i.e. when supplying actuating compressed air or when applying a negative pressure or when venting the corresponding pinch valve housings respectively.

As already stated, the response time of the disclosed dense phase powder pump can be shortened and thus the conveying frequency increased by ensuring that during the suction phase of the dense phase powder pump, i.e. when negative pressure is applied in the powder conveying chamber, this begins at the earliest simultaneously with the opening of the powder inlet valve arranged at the powder inlet of the powder conveying chamber. Alternatively or additionally thereto, the pump frequency can be increased by shortening to the overall greatest extent possible the channels provided for pneumatically actuating the powder inlet valve designed as a pinch valve or powder output valve designed as a pinch valve for supplying or respectively removing actuating compressed air to/from the pinch valves.

Additionally advantageous is shortening the path length of the channels or channel for supplying the conveying compressed air to the at least one powder conveying chamber or the channels or channel for applying vacuum in the powder conveying chamber respectively. Doing so can reduce response lag times when the powder inlet valve or powder outlet valve is actuated and when vacuum is applied in the at least one powder conveying chamber during the suction phase or, respectively, positive pressure is applied during the dispensing phase.

Accordingly increasing the conveying frequency of the dense phase powder pump ensures sufficient homogeneity in the flow of powder dispensed at the powder outlet of the dense phase powder pump.

In order to further increase the homogeneity of the powder flow at the powder outlet of the dense phase powder pump, and particularly to prevent disruptive pulsations in the powder flow from occurring downstream of the powder outlet of the dense phase powder pump, preferential implementations of the disclosed solution make use of an auxiliary compressed air inlet device in addition or alternatively to the aforementioned measures. This auxiliary compressed air inlet device empties into the powder path at least at one point between the powder outlet valve allocated to the at least one powder conveying chamber and the powder outlet of the dense phase powder pump or preferably immediately downstream of the powder outlet of the dense phase powder pump and serves to supply auxiliary compressed air provided as supplementary conveying compressed air as needed. In other words, in addition to the conveying compressed air introduced into the powder conveying chamber during the dispensing phase of the dense phase powder pump, additional conveying compressed air is supplied immediately upstream or downstream of the powder outlet of the dense phase powder pump at suitable times or circumstances by means of the auxiliary compressed air inlet device.

The at least one auxiliary compressed air inlet device is preferentially implemented by way of a filter tube through which at least part of the powder path between the powder outlet valve and the powder outlet of the dense phase powder pump runs. Preferably, the powder path downstream of the powder outlet valve of the dense phase powder pump passes through the filter tube for part of its length. The filter tube is permeable to compressed air but not to the particles of the coating powder. It thereby makes sense to form the filter tube from microporous material such as sintered material, for example. The filter tube forms a peripheral wall around the powder path and thus a relatively large area through which even small amounts of auxiliary compressed air can flow homogeneously into the powder path through the filter tube and affect powder particles in the sense of powder concentration homogenization.

However, it is of course also possible to design the auxiliary compressed air inlet device without a filter element, in particular a filter tube. The filter element or filter tube respectively only serves to prevent powder particles from infiltrating into an auxiliary compressed air line connected to the auxiliary compressed air inlet device.

In order to be able to reduce or prevent particularly impactful flow pulsations in the powder path downstream of the powder outlet of the dense phase powder pump, it is advantageous for auxiliary compressed air to be introduced into the powder path in a pulsating flow downstream of the powder outlet valve of the dense phase powder pump via the auxiliary compressed air inlet device. The pulse frequency of the auxiliary compressed air should thereby be at least the same as the powder conveying chamber frequency at which portions of powder are dispensed from the powder conveying chamber.

Preferential implementations of the disclosed dense phase powder pump provide for the pulse frequency of the auxiliary compressed air to be the same as the powder conveying chamber frequency; i.e. the frequency at which portions of powder are dispensed from the powder conveying chamber. In conjunction with this, providing a mechanism to supply pulsating auxiliary compressed air to the at least one auxiliary compressed air inlet device is advisable, whereby this mechanism for supplying pulsating auxiliary compressed air is advantageously designed such that the auxiliary compressed air is supplied to the at least one auxiliary compressed air inlet device in phase opposition with respect to the powder dispensing cycle. So doing can thereby achieve the auxiliary compressed air always being fed into the powder path after the powder outlet valve when the powder outlet valve is closed. This measure in particular enables the flow rate in the powder line downstream of the powder outlet of the dense phase powder pump to assume a constant value without any fluctuations occurring.

The present disclosure is in particular also based on the realization that particularly also in the case of a dense phase powder pump designed as a single-chamber dense phase powder pump, feeding auxiliary compressed air as additional conveying compressed air at the powder outlet of the dense phase powder pump is advantageous, wherein the powder/air mixture downstream of the powder outlet of the dense phase powder pump flows through the powder line more homogeneously when the volume of additional compressed air fed into the powder path downstream of the powder outlet valve during the suction phase of the powder conveying chamber is essentially the same as the volume of conveying compressed air fed into the powder conveying chamber during the powder dispensing phase which serves to pneumatically expel the portion of powder previously sucked into the powder conveying chamber.

In order to implement this knowledge in the disclosed dense phase powder pump, it is on the one hand conceivable to provide a mechanism for supplying pulsating auxiliary compressed air to the at least one additional pressure inlet device, whereby this mechanism adapts the volume of the auxiliary compressed air fed into the powder path to the volume of conveying compressed air fed into the powder conveying chamber.

A complex compressed air volume control can in particular be dispensed with when the pneumatic resistances occurring when conveying compressed air is fed into the powder conveying chamber and when auxiliary compressed air is fed into the powder path assume substantially the same value. In order to achieve this, it is advantageous for at least the essential components of the auxiliary compressed air inlet device; i.e. the components needed for the feed of the auxiliary compressed air into the powder path, to have the same structure as the essential components of the powder conveying chamber; i.e. the components of the powder conveying chamber needed for the feed of the conveying compressed air during the dispensing phase of the powder conveying chamber. Conceivable in this context, for example, is for the auxiliary compressed air inlet device to include a chamber wall having at least part of its length formed by a filter which encloses the powder path and separates it from an intermediate chamber surrounding the filter and formed between the filter and a housing of the auxiliary compressed air inlet device. At least the filter of the auxiliary compressed air inlet device should thereby be structurally identical to the filter of the powder conveying chamber.

On the other hand, it is further conceivable for a control device to be provided by means of which the auxiliary compressed air frequency can be preferably automatically adjusted, preferably automatically controlled or regulated, as a function of the powder dispensing frequency of the powder conveying chamber. This ensuing particularly by the pulse frequency of the auxiliary compressed air being adapted to the frequency of the powder conveying chamber, wherein the auxiliary compressed air is then advantageously always fed into the powder path after the powder outlet valve of the dense phase powder pump when the dense phase powder pump is in its suction phase in which the powder inlet valve is open and the powder outlet valve closed, ensures that a sufficient volume of conveying compressed air as needed to convey the coating powder is always employed.

Of course, however, it is also conceivable to additionally introduce auxiliary com-pressed into the powder path after the powder outlet valve of the dense phase powder pump during the dispensing phase of the dense phase powder pump.

However, only feeding auxiliary compressed air into the powder path via the auxiliary compressed air inlet device when the dense phase powder pump is in its suction phase allows reducing the resources (compressed air and thus energy) needed to operate the dense phase powder pump. Doing so in particular also prevents there being too much conveying compressed air in the powder path downstream of the powder outlet of the dense phase powder pump so as to prevent powder particles from being expelled out of the spray at the unit arranged downstream of the dense phase powder pump (powder spray coating gun or similar device for spraying coating powder).

It is particularly advantageous in this context for a control device to be able to adjust, preferably automatically control or regulate, the volume of auxiliary compressed air flowing through the auxiliary compressed air inlet device per unit of time, as introduced into the powder path after the powder outlet valve of the dense phase powder pump, as a function of the total amount of powder conveyed per unit of time.

With respect to a method for conveying coating powder from a first powder reservoir to a second powder reservoir arranged downstream of the first powder reservoir or to a powder spray coating gun or similar device for spraying coating powder arranged downstream of the first powder reservoir, the present disclosure provides for the method to have the method step of providing a powder spray coating device including the disclosed dense phase powder pump as well as at least one spray coating gun and the method step of performing a specific operating cycle, wherein said specific operating cycle includes the following cycle steps:
  generating negative pressure in the at least one powder conveying chamber of the dense phase powder pump for drawing coating powder into the powder conveying chamber through an open powder inlet valve of the dense phase powder pump while the powder outlet valve of the dense phase powder pump is closed;
  closing the powder inlet valve and opening the powder outlet valve;
  introducing compressed gas into the powder conveying chamber to dispense the coating powder from the powder conveying chamber through the open powder outlet valve while the powder inlet valve is closed; and
  closing the powder outlet valve and opening the powder inlet valve.

According to one aspect of the disclosed method, it is provided for cleaning air to be fed into the powder path at least at one point at the powder outlet area of the powder conveying chamber in the third cycle step above. Alternatively or additionally, it is provided for cleaning air to be fed into the powder path at least at one point at the powder inlet area of the dense phase powder pump in the fourth cycle step above.

BRIEF DESCRIPTION OF THE DRAWINGS

The following will reference the accompanying drawings in describing an exemplary embodiment of the present disclosure in greater detail.
Shown are.

DETAILED DESCRIPTION

Figure 3:
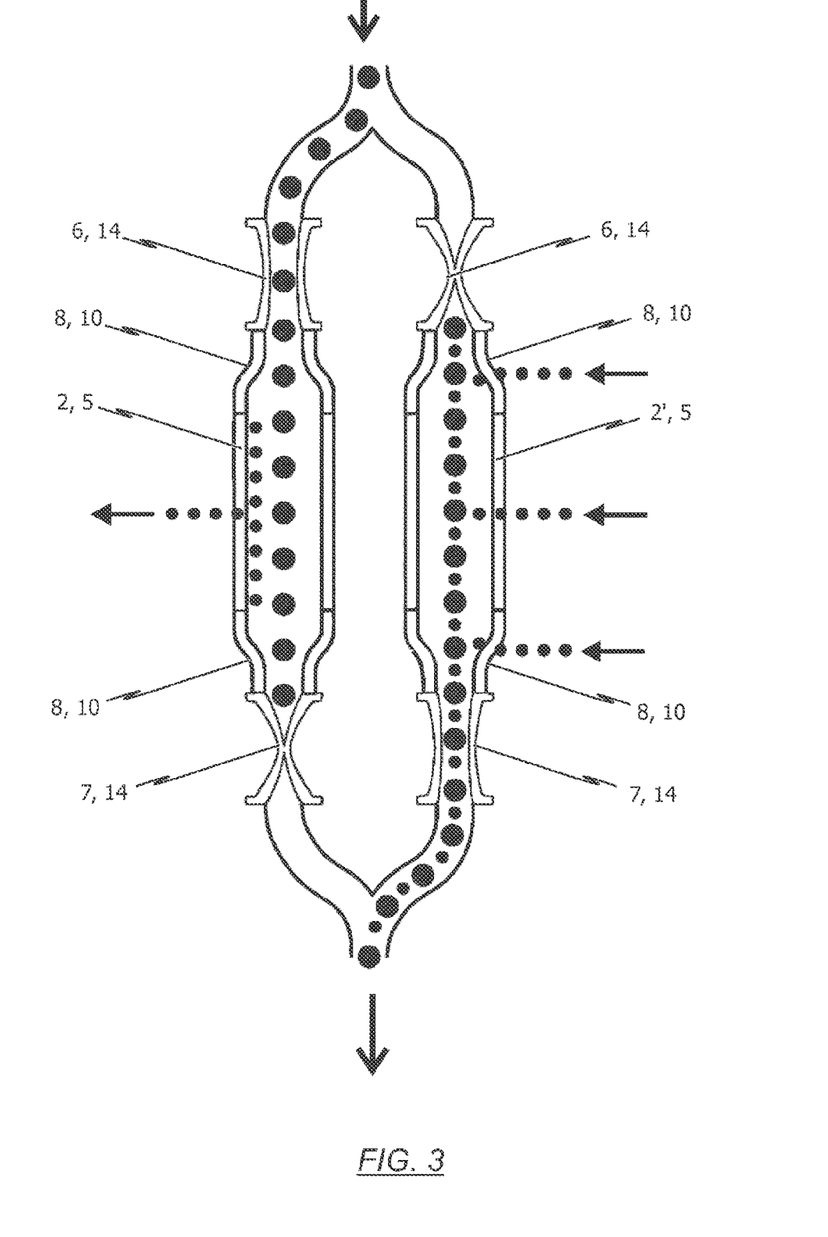
FIG. 3 a schematic diagram of the operational principle of the exemplary embodiment of the disclosed dense phase powder pump according to FIG. 1.

The following will reference the illustration in FIG. 3 in first describing the operational principle of a dense phase powder pump 1 according to an exemplary embodiment of the present disclosure using two parallelly arranged powder conveying chambers 2, 2'.

As shown schematically in FIG. 3, each of the two parallelly arranged powder conveying chambers 2, 2' exhibits an in particular cylindrical main body region 3 having an at least substantially uniform effective sectional area of flow. Each particularly cylindrical main body region 3 of the two powder conveying chambers 2, 2' has a cylindrical, in particular circular cylindrical, casing tube 4 and a filter element 5 accommodated in the interior of the casing tube 4. The filter element 5 of the main body region 3 of the powder conveying chamber 2, 2' is in particular a cylindrical filter element 5.

Each powder conveying chamber 2, 2' has a powder inlet with a powder inlet valve 6 and a powder outlet with a powder outlet valve 7. The respective powder inlet valves 6 are also referred to as "first valves" or "suction-side valves" in the following. The powder outlet valves 7 are also referred to as "second valves" or "conveyance-side valves."

The respective suction-side and conveyance-side end regions of the main body regions of the powder conveying chambers 2, 2' have a transition region 8 which is designed to reduce an effective sectional area of flow of the powder conveying chamber 2, 2' to an effective sectional area of flow of the respective connected powder line 9 or to reduce the effective sectional area of flow of the valve 6, 7 arranged between the powder conveying conveyor 2, 2' and the powder line 9 respectively. The transition region 8 is thereby in particular at least in part implemented as a conical region.

The respective transition regions 8 arranged on the suction-side end region of the main body region 3 of the powder conveying chamber 2, 2' and on the conveyance-side end region of the main body region 3 of the powder conveying chamber 2, 2' are designed as separate components from the main body region 3 which are or can be detachably connected to the main body region 3 of the powder conveying chamber 2, 2'.

The transition regions 8 serve to adapt/reduce the nominal width of the main body region 3 of the powder conveying chamber 2, 2'; i.e. the inner diameter of the main body region 3 of the powder conveying chamber 2, 2', to the nominal width of the respective connected powder line 9 or the nominal width of the intervening valve 6, 7 respectively.

The transition regions 8 include an in particular conical filter element 10 accommodated in a filter housing 11.

A vacuum (negative pressure) is generated in one of the powder conveying chambers 2, 2' of the dense phase powder pump 1 during a suction process. The negative pressure draws the powder to be conveyed, in particular coating powder, into the powder conveying chamber 2, 2' via the corresponding powder inlet. The fine-porous filter element 5 in the main body region 3 of the powder conveying chamber 2, 2' separates the powder. During the suction process, the powder conveying chamber 2, 2' is closed on the respective suction side or conveyance side by the corresponding conveyance-side valve.

During the conveying process, on the other hand, the suction-side valve 6 on the powder inlet side of the powder conveying chamber 2, 2' is closed while the conveyance-side valve 7 is opened. The coating powder previously drawn into the powder conveying chamber 2, 2' during the suction process is then forced out of the powder conveying chamber 2, 2' and conveyed further by the positive pressure built up with the compressed air through the fine-porous filter element 5 of the main body region 3.

As can be noted from FIG. 3, the suction and conveying process alternates between the two parallelly arranged powder conveying chambers 2, 2'. In other words, the two parallelly arranged powder conveying chambers 2, 2' operate in phase opposition.

The schematic depiction in FIG. 3 further indicate the mode of operation of the conical filter elements 10 in the transition region 8 at the powder outlet end region and at the powder inlet or conveyance end region of the main body region 3 of the powder conveying chamber 2, 2'.

In detail, according to implementations of the present disclosure, not only is positive pressure applied to an annular space between the cylindrical filter element 5 of the main body region 3 and the cylindrical casing tube 4 of the main body region 3 during the conveying process, thus when the suction-side valve 6 on the powder inlet side of the powder conveying chamber 2, 2' is closed and the conveyance-side valve 7 is opened, but also to the respective conical filter element 10 of the transition regions 8. In doing so, cleaning air in the form of compressed air is supplied to both end regions of the powder conveying chamber 2, 2' during the conveying process via the conical filter elements 10 so as to keep the end regions free of powder deposits or to remove powder deposits at the end regions.

Figure 1:
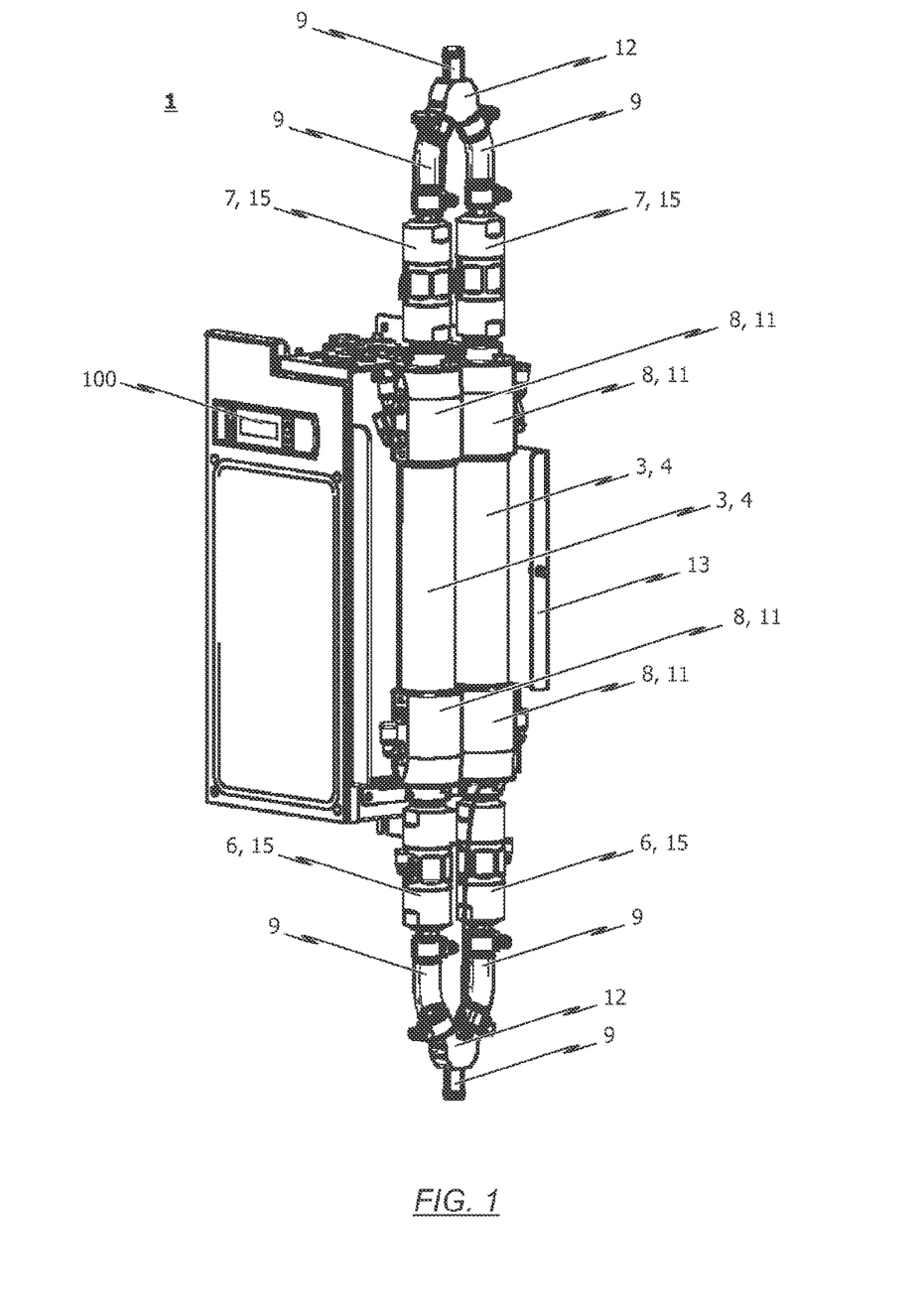
FIG. 1 a schematic and isometric view of one exemplary embodiment of the disclosed dense phase powder pump having two powder conveying chambers arranged parallel to one another.
Figure 2:
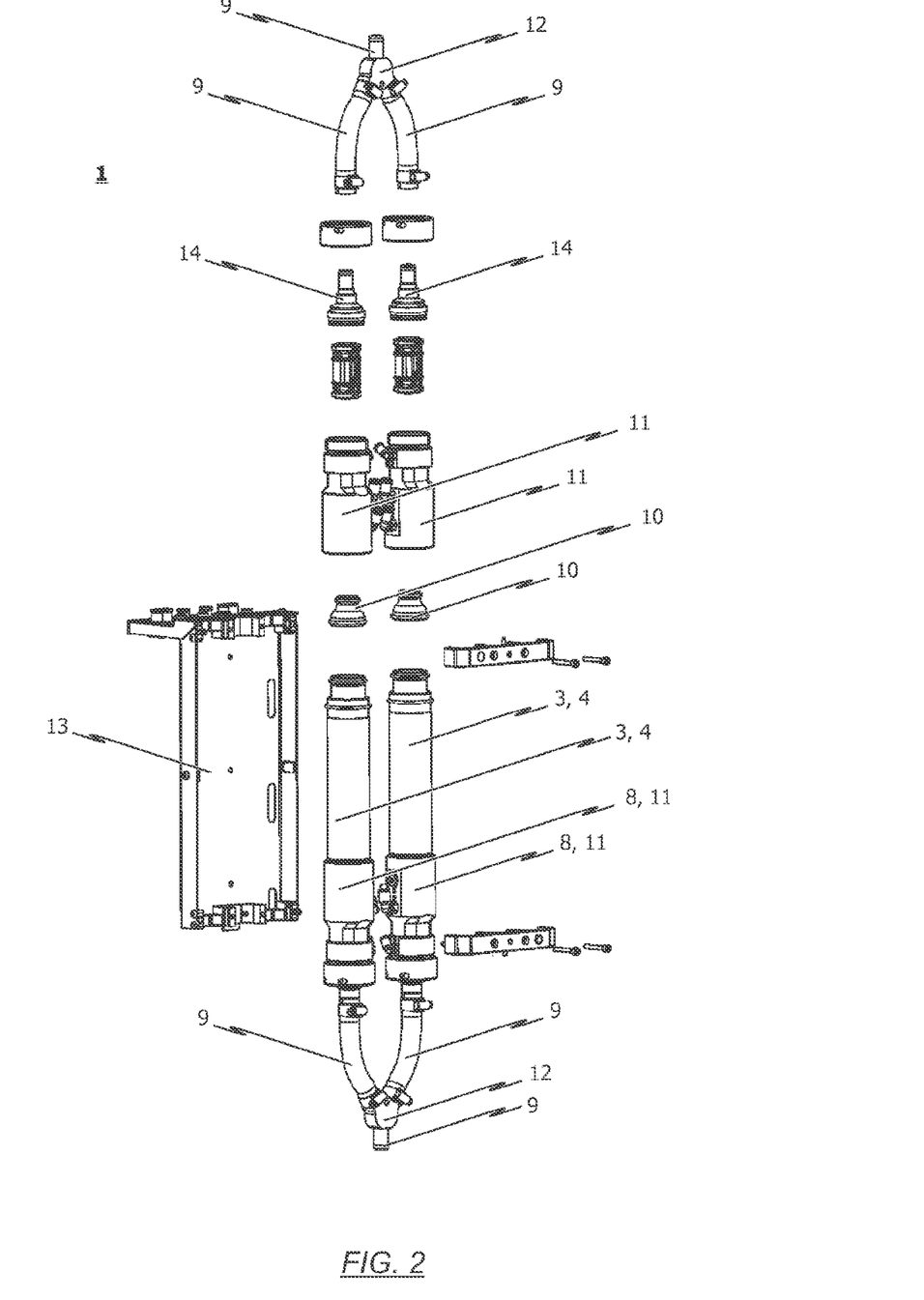
FIG. 2 a schematic and exploded view of the exemplary embodiment of the disclosed dense phase powder pump shown in FIG. 1.

The following will reference the illustrations in FIG. 1 and FIG. 2 in describing an exemplary embodiment of a dense phase powder pump 1 using two parallelly arranged powder conveying chambers 2, 2' according to one embodiment of the present disclosure.

Specifically, FIG. 1 shows the structure of a dense phase powder pump 1 having two parallelly arranged powder conveying chambers 2, 2' according to an exemplary embodiment of the present disclosure in an isometric view. The dense phase powder pump 1 has two powder conveying chambers 2, 2', wherein each of the two powder conveying chambers 2, 2' exhibit a cylindrical main body region 3 having a cylindrical and in particular circular cylindrical casing tube 4 and a gas-permeable filter element 5 arranged inside the casing tube 4. The filter element 5 is preferably a rigid body made from sintered material, preferably sintered metal, e.g. bronze or aluminum, or from sintered plastic or a sintered material mixture.

As can be seen in particular from the exploded view shown in FIG. 2, the main body region 3 of each powder conveying chamber 2, 2' has a transition region 8 at the suction and conveyance sides which is detachably connected or connectable to the main body region 3 and a part of the powder conveying chamber 2, 2'. The transition region 8 thereby serves to adapt/reduce the nominal width of the main body region 3 of the powder conveying chamber 2, 2' to the nominal width of a respective suction-side or conveyance-side valve 6, 7.

In order to accordingly reduce the nominal width; i.e. the inner diameter of the cylindrical main body region 3 of the powder conveying chamber 2, 2', to the (reduced) nominal width of the corresponding valve 6, 7 or corresponding powder line 9 respectively, each transition region 8 has a filter element 10 which in particular tapers conically in the direction of the valve 6, 7 or the flow line.

The filter element 10 is—as is the filter element 5 of the main body region 3—preferably a rigid body made in particular from sintered material, preferably sintered metal, e.g. bronze or aluminum, or from sintered plastic or a sintered material mixture. Of course, other embodiments for the filter element 10 of the transition region 8 conically tapering in the direction of the respective valve 6, 7 are also conceivable.

The filter element 10 conically tapering in the direction of the respective valve 6, 7 defines the effective sectional area of flow of the transition region 8 in order to accordingly adapt the nominal width of the main body region 3 of the powder conveying chamber 2, 2' to the nominal width of the valve 6, 7 connected to the respective end region of the powder conveying chamber 2, 2'.

As can be seen from the exploded view in FIG. 2, the respective conically tapering filter element 10 of the transition region 8 is detachably connected to the corresponding end region of the main body region 3 of the powder conveying chamber 2, 2', particularly by means of a screw coupling or other releasable connection, for example using a bayonet coupling or fixable plug connection.

Each transition region 8 further exhibits a corresponding filter housing 11 in which the conically tapering filter element 10 can be accommodated. An air gap is formed between the interior of the filter housing 11 and the exterior of the conically tapering filter element 10 which is able to be pressurized as needed via a corresponding air line.

A first pinch valve 6 connected to the suction-side end region of the powder conveying chamber 2, 2' is provided at the powder inlet of each powder conveying chamber 2, 2' of the dense phase powder pump 1 shown schematically in FIG. 1 and FIG. 2. A second pinch valve 7 is connected to the respective conveyance-side end region of the powder conveying chamber 2, 2'; i.e. to the conveyance-side end region of the transition region 8 of the powder conveying chamber 2, 2'.

Although pinch valves are in each case used as powder inlet and powder outlet valves 6, 7 in the exemplary embodiment, these can of course be of any type.

In the depicted embodiment, supply line branches of a Y-connector 12 connect the powder inlet side of the two first (suction-side) valves 6 to a powder supply line 9 leading to, for example, a container of powder (not depicted in the drawings). Hose couplings are thereby used to connect the powder inlet side of the two first valves 6 (pinch valves) to the supply line branches of the Y-connector 12.

However, it is also conceivable for the respective powder inlet sides of the first (suction side) valves/pinch valves 6 to be fluidly connected to one or two different powder containers via separate powder supply lines instead of a Y-connector 12.

In the embodiment as depicted, dispensing line branches, e.g. likewise a Y-shaped line connector 12, connect the powder outlets of the two second (conveyance side) valve/ pinch valves 7 to one end of a powder dispensing hose 9, the other end of which opens into a further (not depicted) container of powder. While the powder dispensing line can be a rigid tubing, it is preferably a flexible hose.

In the embodiment depicted in FIG. 1 and FIG. 2, each of the powder conveying chambers 2, 2' are accommodated and fixed in a mounting 13. The powder conveying chambers 2, 2' are in particular connected to the mounting 13 by means of a disengageable screw or bayonet coupling.

The following will reference the exploded view according to FIG. 2 in describing the structure of each powder conveying chamber 2, 2' used in the dense phase powder pump 1 in greater detail.

Accordingly, each powder conveying chamber 2, 2' is divided into a main body region 3 having an at least substantially uniform effective sectional area of flow and two transition regions 8 with a conical sectional area of flow arranged at the respective end regions of the main body region 3.

The in particular cylindrical main body region 3 of each powder conveying chamber 2, 2' is associated with a respective casing tube 4, the interior of which has an assigned gas-permeable and at least substantially cylindrical filter element 5. The casing tube 4 with the filter element 5 accommodated inside forms the main body region 3 of each powder conveying chamber 2, 2'.

A suction-side transition region 8 of the aforementioned type is provided at the suction-side end region of the main body region 3 of the powder conveying chamber 2, 2'. In other words, the suction-side end region of the main body region 3 is assigned a conically tapering filter element 10 having a corresponding casing area 11 associated with the conically tapering filter element 10. The same applies in the figurative sense to the transition region 8 correspondingly arranged at the conveyance-side end region of the main body region 3 of the powder conveying chamber 2, 2'.

In the exemplary embodiment of the disclosed dense phase powder pump 1 shown in the drawings, the first (suction side) valves 6 and the second (conveyance side) valves 7 are preferably each designed as pinch valves.

Each pinch valve 6, 7 has a pinch valve housing 15 with an inlet-side flange and an outlet-side flange. An elastically deformable valve element 14 is accommodated in the pinch valve housing 15. The elastically deformable valve element 14 is in particular an elastically deformable hose section. Each flange has a powder line connection (hose connection) to which a powder line 9 (powder hose) can be connected.

Figure 4:
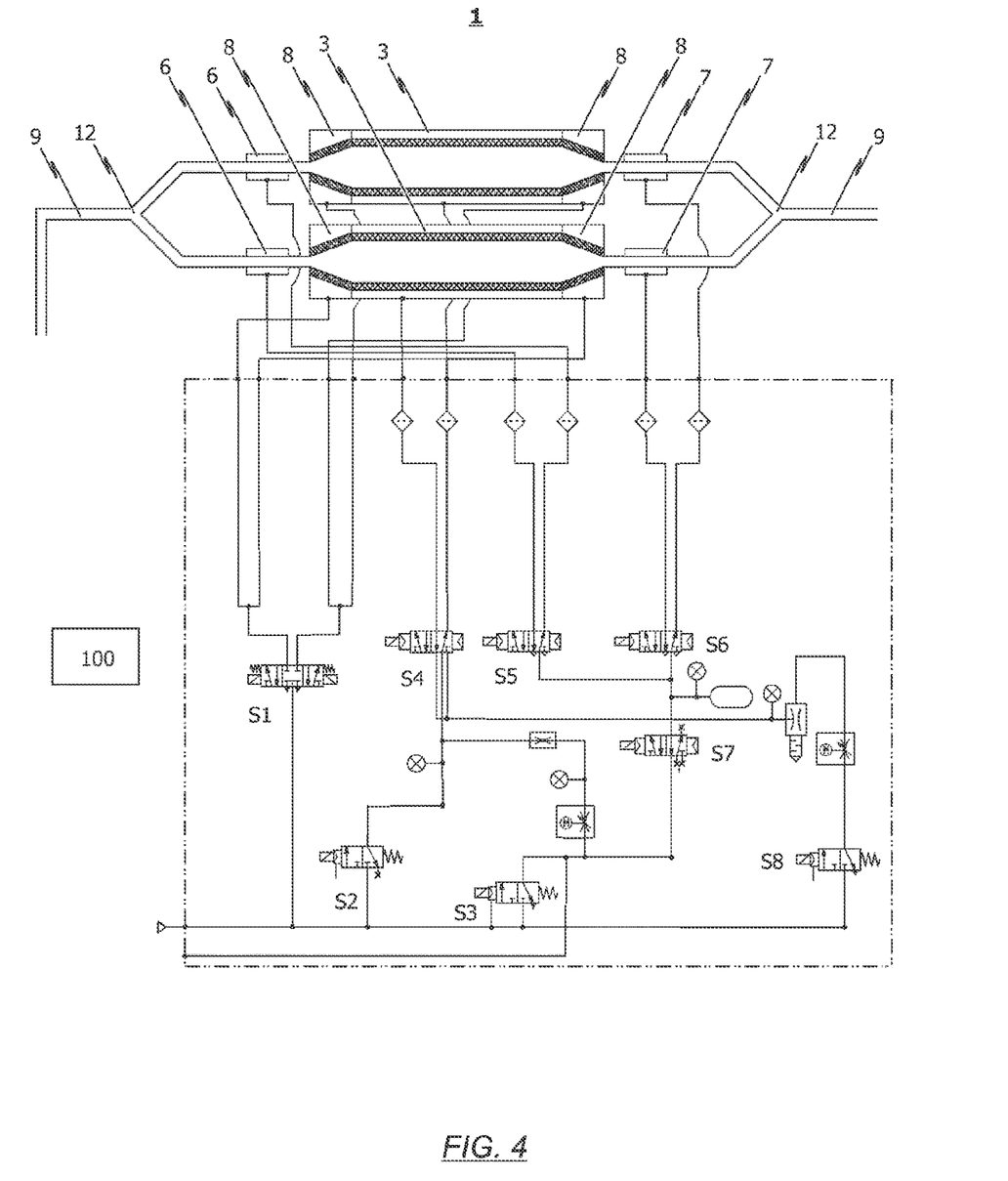
FIG. 4 a schematic pneumatic diagram of the exemplary embodiment of the disclosed dense phase powder pump according to FIG. 1.

As can be seen for example in the pneumatic diagram according to FIG. 4, the conically tapering filter element 10 is arranged within a corresponding filter housing 11 in each transition region 8 such that an inlet of the conically tapered filter element 10 can be brought into fluid communication with the outlet of the main body region 3 of the powder conveying chamber 2, 2'.

The filter housing 11 of the transition region 8 includes a connection 16 in order to supply compressed air as needed into the space formed between the inner wall of the filter housing 11 and the conically tapering filter element 10 arranged inside the filter housing 11. When compressed air is supplied, the area of the conveying chamber 2, 2' formed by the transition region 8 is accordingly flushed and deposits of powder there are removed or, respectively, powder deposits are prevented from accumulating there.

In the exemplary embodiment of the disclosed dense phase powder pump 1 shown in the drawings, each first and second valve 6, 7 is designed as a pinch valve, whereby each pinch valve 6, 7 is allocated an elastically deformable valve element 14 which is arranged within a corresponding pinch valve housing 15 such that the inlet of the pinch valve 6, 7 can be brought into fluid communication with the outlet of the pinch valve 6, 7 by the valve element formed as an elastically deformable valve element 14.

The pinch valve housing 15 has a connection 17 in order to supply compressed air as needed into the space formed between the inner wall of the pinch valve housing 15 and the valve element 14 arranged inside the pinch valve housing 15. Upon compressed air being supplied, the valve element 14 is elastically deformed so as to interrupt the fluid communication between the inlet and the outlet of the pinch valve 6, 7. However, when there is no compressed air in the gap between the inner wall of the pinch valve housing 15 and the valve element 14 arranged inside the pinch valve housing 15, the previously elastically deformed valve element 14 returns to its initial state with the inlet and the outlet of the pinch valve housing 15 being in fluid communication.

A vacuum connection can also be connected via the at least one connection of the pinch valve 6, 7 for evacuating the compressed air previously introduced into the gap in order to rapidly open the pinch valve.

The conically tapering filter element 10 of the transition region 8 is preferably designed as a gas-permeable filter element 10 over a circumference of at least 180° and preferably over a circumference of 360°. The filter element 10 preferably consists of microporous material such that it is permeable to air but not to coating powder. For example, the filter element 10 can be composed of a sintered body, e.g. metal or plastic, or of a material mixture containing metal or plastic. It can furthermore be composed of a different material and/or be formed by a filter membrane.

The filter pores of the filter element 10 are preferably designed such that compressed air is directed into the powder path formed/defined by the transition region 8 over a relatively large powder path area in both the circumferential as well as the longitudinal direction of the filter element 10. The micropores of the filter element 10 can be radially or axially inclined toward the powder path.

FIG. 4 shows an exemplary embodiment of a pneumatic diagram for the dense phase powder pump 1 depicted schematically in FIG. 1/FIG. 2.

As schematically shown in FIG. 4, a control device 100, schematically indicated in FIG. 4, is used to operate the dense phase powder pump 1. The control device 100 is designed to suitably control the individual actuatable components of the dense phase powder pump 1, in particular control valves S1 to S8, and coordinate their actuation.

On the one hand, this involves the coordinated activation of the pinch valves 6, 7 via control valves S5, S6 and S7. On the other hand, it involves the suitable activation of control valves S1, S2 and S4 in order to coordinate the supplying of compressed air to the respective main body region 3 of the two powder conveying chambers 2, 2' or, respectively, the applying of an appropriate vacuum. It further involves the suitable activation of control valve S1 in order to coordinate the supplying of compressed air as cleaning air to the respective transition regions 8 of the main body regions of the two powder conveying chambers 2, 2'.

The pneumatic diagram according to FIG. 4 is in particular characterized by dedicated compressed air being fed to the respective transition regions 8 at the suction-side and conveyance-side end regions of the powder conveying chamber 2, 2'. Specifically, this preferably ensues simultaneously with the supply of compressed air to the main body region 3 of the respective powder conveying chamber 2, 2'.

Accordingly, so-called conus flushing; i.e. flushing in the respective transition regions of the powder conveying chamber 2, 2', is only activated during a cleaning cycle.

Alternatively or additionally thereto, however, it is also conceivable to activate this conus cleaning, and to do so during a powder conveying operation. Particularly conceivable in this context is for the conus cleaning to operate at a first intensity during the powder conveying mode and at a second higher intensity during the cleaning mode. The additional amount of air introduced during the cleaning also results in increased cleaning efficiency.

The present disclosure is not limited to the embodiments depicted in the drawings but rather yields from an integrated overall consideration of all the features as disclosed herein.

LIST OF REFERENCE NUMERALS

1 dense phase powder pump
2, 2' powder conveying chamber
3 main body region
4 casing tube
5 filter element
6 powder inlet valve
7 powder outlet valve
8 transition region
9 powder line
10 conical filter element
11 filter housing
12 Y-connector
13 mounting
14 valve element (pinch valve)
15 pinch valve housing
16 connection on filter housing
17 connection on pinch valve housing
100 control device
S1-S8 control valve

The invention claimed is:

1. A powder conveying chamber for a dense phase powder pump for conveying powder, wherein the powder conveying chamber comprises at least one air exchange opening which is designed and formed separately from a cleaning air outlet of an end region of the powder conveying chamber, for alternately connecting fluidly to a vacuum line or vacuum source or to a compressed air supply line or compressed air source for drawing powder into the powder conveying chamber, or pneumatically expelling a portion of powder present within the powder conveying chamber, wherein the end region of the powder conveying chamber is fluidly connected or connectable to a powder line, and is configured as a transition region and designed to reduce an effective sectional area of flow of the powder conveying chamber to an effective sectional area of flow of the powder line and/or to an effective sectional area of flow of a valve, arranged between the powder conveying chamber and the powder line, wherein:

the end region is allocated a cleaning system via which cleaning air in the form of compressed air can be supplied to the end region, in order to keep the end region free of powder deposits or to remove deposits of powder at the end region; and at least part of a wall area of the end region forming the end region of the powder conveying chamber is designed as a porous wall area more permeable to compressed air but less permeable to powder.

2. The powder conveying chamber according to claim 1, wherein the end region of the powder conveying chamber has at least one cleaning air outlet for blowing out the cleaning air in a powder conveying path defined by the transition region of the powder conveying chamber.

3. The powder conveying chamber according to claim 1, wherein the cleaning system has a filter element at least in part tapering conically which is permeable to air but not to powder, wherein the filter element is or can be accommodated in a filter housing able to be supplied with cleaning air in the form of compressed air, wherein the filter element is or can be releasably connected to an end region of a cylindrical main body region of the powder conveying chamber by its larger end region in terms of diameter, and wherein the filter element is or can be releasably connected to an end region of the powder line or to an end region of a valve arranged between the powder conveying chamber and the powder line by its smaller end region in terms of diameter.

4. The powder conveying chamber according to claim 1, wherein a control device is assigned to the cleaning system which is designed to fluidly connect at least one cleaning air outlet of the end region of the powder conveying chamber to a compressed air supply line or a compressed air source when needed, wherein the control device is designed to fluidly connect the at least one cleaning air outlet of the end region of the powder conveying chamber to the compressed air supply line or the compressed air source during a cleaning operation; and/or wherein the control device is designed to fluidly connect the at least one cleaning air outlet of the end region of the powder conveying chamber to the compressed air supply line or compressed air source during a powder output cycle of the powder conveying chamber.

5. The powder conveying chamber according to claim 4, wherein the control device is designed to regulate, as a function of an operating state and/or operating cycle of the powder conveying pump, the volume of compressed air to be supplied to the at least one cleaning air outlet of the end region of the powder conveying chamber per unit of time, wherein the control device is designed to supply a higher volume of compressed air per unit of time to the at least one cleaning air outlet of the end region of the powder conveying chamber during a cleaning operation compared to the volume of compressed air to be supplied to the at least one cleaning air outlet per unit of time during the powder output mode.

6. The powder conveying chamber according to claim 1, wherein the end region of the powder conveying chamber is fluidly connected or connectable to the powder line by means of a pinch valve, wherein the pinch valve exhibits an effective sectional area of flow in its open state, and wherein the end region of the powder conveying chamber is designed to reduce an effective sectional area of flow of the powder conveying chamber to the effective sectional area of flow of the pinch valve in its open state.

7. The powder conveying chamber according to claim 1, wherein the powder conveying chamber comprises a cylindrical main body region having a substantially uniform effective sectional area of flow.

8. The powder conveying chamber according to one of claims 1 to 7,
wherein the end region of the powder conveying chamber is a first end region, and the powder conveying chamber further comprises an oppositely disposed second end region, wherein the powder conveying chamber is or can be fluidly connected to a first powder line via the first end region and is or can be fluidly connected to a second powder line via the second end region, wherein the first and/or second end region of the powder conveying chamber is/are implemented as a transition region and designed to reduce an effective sectional area of flow of the powder conveying chamber to an effective sectional area of flow of the corresponding powder line, and wherein a cleaning system is in each case allocated to the first and/or second end region via which cleaning air in the form of compressed air can be supplied to the respective end region, in order to keep the respective end region free of powder deposits or to remove deposits of powder at the end region.

9. A dense phase powder pump for conveying coating powder from a first powder reservoir to a second downstream powder reservoir or to a downstream powder spray coating gun or device for spraying coating powder, wherein the dense phase powder pump has at least one powder conveying chamber according to claim 1 which is fluidly connected or connectable to the first powder reservoir via a powder inlet and to the second powder reservoir, or to the powder spray coating gun or device for spraying coating powder respectively, via a powder outlet, wherein at least one powder inlet valve is provided at the powder inlet and at least one powder outlet valve is provided at the powder outlet.

10. The dense phase powder pump according to claim 9, wherein the at least one powder inlet valve and the at least one powder outlet valve have substantially the same effective sectional area of flow in their respective open state; or
wherein the powder inlet valve exhibits a larger effective sectional area of flow in the open state than an effective sectional area of flow of the powder outlet valve in its open state.

11. The dense phase powder pump according to claim 9, wherein the dense phase powder pump is designed as a single-chamber dense phase powder pump and only has a single powder conveying chamber for the conveyance of coating powder.

12. The dense phase powder pump according to claim 9, wherein the dense phase powder pump is designed as a multi-chamber dense phase powder pump and has a plurality of powder conveying chambers connected in parallel to each other for the conveyance of coating powder.

13. The dense phase powder pump according to claim 9, wherein the at least one powder conveying chamber has the powder inlet at the end region which is a first end region, and has the powder outlet at an oppositely disposed second end region, wherein the at least one powder inlet valve and at least one powder outlet valve are arranged at respectively opposite end regions of the at least one powder conveying chamber.

14. The dense phase powder pump according to claim 9, wherein the at least one powder conveying chamber has a powder duct at the end region which serves both as a powder inlet as well as a powder outlet, wherein the at least one powder inlet valve and at least one powder outlet valve are in each case provided in the powder duct.

15. The dense phase powder pump according to claim 14, wherein a distributor, in the form of a Y-piece, is furthermore provided for fluidly connecting the powder duct of the at least one powder conveying chamber to the at least one powder inlet valve on one side and the at least one powder outlet valve on the other.

16. The dense phase powder pump according to claim 9, wherein a control device is furthermore provided to control the at least one powder inlet valve and/or the at least one powder outlet valve as well as to alternately apply positive pressure and negative pressure in the at least one powder conveying chamber.

17. The dense phase powder pump according to claim 16, wherein the at least one powder inlet valve and the at least one powder outlet valve are separately controllable.

18. The dense phase powder pump according to claim 9, wherein the at least one powder inlet valve and the at least one powder outlet valve are each designed as a pinch valve, of a style having a flexible elastic hose as a valve channel which is able to be squeezed together in a pressure chamber surrounding the hose by means of actuating compressed air in order to close the corresponding valve.

19. The dense phase powder pump according to claim 9, wherein a control device is provided which is designed to alternately connect the at least one air exchange opening of the at least one powder conveying chamber to the vacuum line or vacuum source for drawing coating powder into the at least one powder conveying chamber through the at least one open powder inlet valve while the at least one powder outlet valve is closed, or to the compressed air line supply line or compressed air source for pneumatically expelling a portion of powder present within the at least one powder conveying chamber though the at least one open powder outlet valve while the at least one powder inlet valve is closed.

20. The dense phase powder pump according to claim 9, wherein at least one auxiliary compressed air inlet device furthermore empties into the powder path at least at one point after the at least one powder outlet valve for supplying auxiliary compressed air as supplementary conveying compressed air when needed, wherein the auxiliary compressed air inlet device empties into the powder path at least at one point between the powder outlet valve and the powder outlet of the dense phase powder pump.

21. The dense phase powder pump according to claim 20, wherein the auxiliary compressed air inlet device is designed to introduce auxiliary compressed air into the powder path in a pulsating flow.

22. The dense phase powder pump according to claim 20, wherein a mechanism for supplying pulsating auxiliary compressed air to the at least one auxiliary compressed air inlet device is further provided, wherein a pulse frequency of the auxiliary compressed air is at least as high as a frequency of the at least one powder conveying chamber at which portions of powder are dispensed from the at least one powder conveying chamber.

23. The dense phase powder pump according claim 22, wherein the pulse frequency of the auxiliary compressed air is the same as the frequency of the at least one powder conveying chamber at which portions of powder are dispensed from the powder conveying chamber, and wherein the mechanism for supplying pulsating auxiliary compressed to the at least one auxiliary compressed air inlet device is designed such that the auxiliary compressed air is supplied to the at least one auxiliary compressed air inlet device in phase opposition with respect to the powder dispensing cycle of the at least one powder conveying chamber.

* * * * *